J. A. TOPLIFF & G. H. ELY.

Improvement in Top-Joints for Carriages.

No. 132,188.                                Patented Oct. 15, 1872.

Witnesses

Inventors.
John A. Topliff
Geo. H. Ely

UNITED STATES PATENT OFFICE.

JOHN A. TOPLIFF AND GEORGE H. ELY, OF ELYRIA, OHIO.

IMPROVEMENT IN TOP JOINTS FOR CARRIAGES.

Specification forming part of Letters Patent No. 132,188, dated October 15, 1872; antedated October 11, 1872.

*To all whom it may concern:*

Figure 1:
Figure 2:
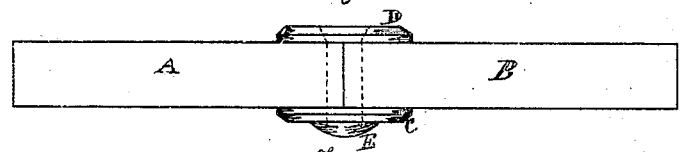
Figure 7:

Be it known that we, JOHN A. TOPLIFF and GEO. H. ELY, both of Elyria, in the county of Lorain and State of Ohio, have invented certain Improvements in Top Joints, of which the following is a specification:

In the drawing, Figure 1 is a side view of the joint; Fig. 2 is a top view of the same; Figs. 3, 4, 5, and 6 are detached views of Figs. 1 and 2, respectively; and Fig. 7 is the rivet which holds the two arms A and B together, as shown in Figs. 1 and 2.

Figure 3:
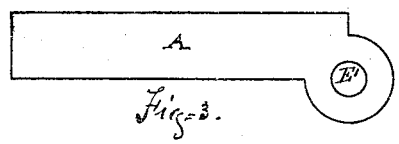
Figure 4:
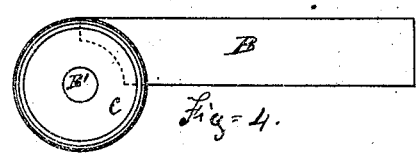
Figure 5:
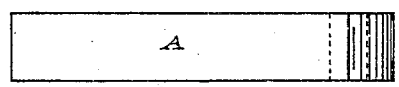
Figure 6:
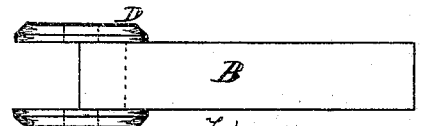

The objection to the ordinary joint made by a tongue and groove is that so much of the iron is cut away in forming the tongue as to weaken the joint, making them liable to fail by the tongue breaking off. Our improvement consists in leaving the tongue full size of the arm A, as shown in Fig. 5, and instead of cutting a groove in arm B, Fig. 6, we form ears C D on the outside of this arm. The rivet E then, passing through these ears and the tongue on the arm A at E', as shown in Fig. 3, forms the joint, as shown in Figs. 1 and 2.

We claim—

Forming the ears C and D on the outside of the arm B, as shown and described, in combination with corresponding arm A.

JOHN A. TOPLIFF.
GEO. H. ELY.

Witnesses:
T. B. HAMMOND,
JAY TERRELL.